United States Patent [19]

Fitzgerald et al.

[11] Patent Number: 5,734,963
[45] Date of Patent: Mar. 31, 1998

[54] REMOTE INITIATED MESSAGING APPARATUS AND METHOD IN A TWO WAY WIRELESS DATA COMMUNICATIONS NETWORK

[75] Inventors: Brendan T. Fitzgerald, Indialantic; Andrew T. Powshok, Indian Harbour Beach, both of Fla.; Donald K. Belcher, Rogersville, Tenn.; Jeffrey R. White, Melbourne Village, Fla.; Albert D. Darby, Jr., Valkaria, Fla.; Rodney Nelson, Merritt Island, Fla.

[73] Assignee: Flash Comm, Inc., Melbourne, Fla.

[21] Appl. No.: 471,980

[22] Filed: Jun. 6, 1995

[51] Int. Cl.$^6$ .................................. H04Q 7/20
[52] U.S. Cl. .................. 455/31.2; 455/452; 455/62
[58] Field of Search ........................ 379/57, 58, 63, 379/59; 455/33.1, 34.1, 54.1, 62, 67.1, 56.1, 31.2, 450, 452, 455, 501, 509, 514; 340/825.44, 311.1; 370/94.1; 375/200

[56] References Cited

U.S. PATENT DOCUMENTS

| | | |
|---|---|---|
| Re. 25,834 | 8/1965 | Gelzer et al. |
| 3,179,907 | 4/1965 | Brand et al. |
| 3,183,464 | 5/1965 | Takahata et al. |
| 3,475,703 | 10/1969 | Kennedy et al. |
| 3,477,299 | 11/1969 | Speer et al. |
| 3,510,808 | 5/1970 | Baker. |
| 3,688,048 | 8/1972 | Clark. |
| 3,702,958 | 11/1972 | Reynolds ............... 361/298.5 |
| 3,723,882 | 3/1973 | Carlson. |
| 3,914,715 | 10/1975 | Hubing et al. |
| 3,956,701 | 5/1976 | James, Jr. et al. |
| 4,025,882 | 5/1977 | Takeo. |
| 4,050,050 | 9/1977 | Nakanishi et al. |
| 4,052,675 | 10/1977 | Valdettaro. |
| 4,063,229 | 12/1977 | Welsh et al. |
| 4,083,003 | 4/1978 | Haemmig. |
| 4,107,689 | 8/1978 | Jellinek. |
| 4,123,754 | 10/1978 | Armstrong. |
| 4,129,749 | 12/1978 | Goldman. |

(List continued on next page.)

FOREIGN PATENT DOCUMENTS

| | | |
|---|---|---|
| 8500482 | 1/1985 | WIPO. |
| 9408361 | 4/1994 | WIPO. |
| 9419873 | 9/1994 | WIPO. |

*Primary Examiner*—Dwayne Bost
*Assistant Examiner*—William G. Trost
*Attorney, Agent, or Firm*—Hamilton, Brook, Smith & Reynolds, P.C.

[57] ABSTRACT

A two-way communications system provides ubiquitous wireless data communication services, such as throughout the continental United States, by using a network of only a few, widely distributed radio base station (RBS) sites and the existing paging network infrastructure. A network hub or mission operation center (MOC) coordinates the operation of the paging systems and RBSs from a central location. The paging network infrastructure is used as an outbound link over which each of the field units is regularly provided with a outbound data message containing information on the available frequencies and time slots the field units can use to transmit inbound data messages to the RBSs. If any of the field units desires to transmit data to MOC, the field unit selects an available frequency from the outbound data message, and transmits its data at the selected available frequency and time. At least one of the RBSs will receive the inbound message and route it to the MOC which then sends an outbound acknowledgment message, via the paging network, to the field unit which sent the inbound message.

22 Claims, 6 Drawing Sheets

U.S. PATENT DOCUMENTS

| | | | |
|---|---|---|---|
| 4,185,287 | 1/1980 | Hubing et al. | |
| 4,207,522 | 6/1980 | Thornton et al. | |
| 4,234,960 | 11/1980 | Spilsbury et al. | |
| 4,263,674 | 4/1981 | Morii et al. | |
| 4,320,400 | 3/1982 | Chasek. | |
| 4,360,927 | 11/1982 | Bowen et al. | |
| 4,363,134 | 12/1982 | Murata et al. | |
| 4,409,687 | 10/1983 | Berti et al. | |
| 4,491,978 | 1/1985 | Nagata et al. | |
| 4,523,184 | 6/1985 | Abel. | |
| 4,531,232 | 7/1985 | Sakurai. | |
| 4,541,119 | 9/1985 | Cooper et al. | |
| 4,584,709 | 4/1986 | Kneisel et al. | |
| 4,608,559 | 8/1986 | Friedman et al. | |
| 4,608,712 | 8/1986 | Fedde. | |
| 4,617,831 | 10/1986 | Ohashi et al. | |
| 4,625,212 | 11/1986 | Oda et al. | |
| 4,628,152 | 12/1986 | Akerberg. | |
| 4,644,351 | 2/1987 | Zabarsky et al. | |
| 4,644,561 | 2/1987 | Paneth et al. | |
| 4,665,401 | 5/1987 | Garrard et al. | |
| 4,682,367 | 7/1987 | Childress et al. | |
| 4,712,112 | 12/1987 | Carr. | |
| 4,740,792 | 4/1988 | Sagey et al. | |
| 4,792,988 | 12/1988 | Ohashi et al. | |
| 4,804,967 | 2/1989 | Ohe et al. | |
| 4,819,001 | 4/1989 | Ohe et al. | |
| 4,823,142 | 4/1989 | Ohe et al. | |
| 4,849,750 | 7/1989 | Andros et al. | |
| 4,850,030 | 7/1989 | Hashimoto et al. | 455/31 |
| 4,851,830 | 7/1989 | Andros et al. | |
| 4,853,688 | 8/1989 | Andros et al. | |
| 4,856,083 | 8/1989 | Makino. | |
| 4,857,915 | 8/1989 | Andros et al. | |
| 4,873,532 | 10/1989 | Sakurai et al. | |
| 4,879,570 | 11/1989 | Takizawa et al. | |
| 4,891,637 | 1/1990 | Siwiak et al. | |
| 4,894,856 | 1/1990 | Nakanishi et al. | |
| 4,897,835 | 1/1990 | Gaskill et al. | |
| 4,935,732 | 6/1990 | Andros et al. | |
| 4,965,607 | 10/1990 | Wilkins et al. | |
| 5,017,926 | 5/1991 | Ames et al. | 342/353 |
| 5,027,431 | 6/1991 | Tanaka et al. | 455/214 |
| 5,032,845 | 7/1991 | Velasco. | |
| 5,046,130 | 9/1991 | Hall et al. | |
| 5,052,049 | 9/1991 | Andros et al. | |
| 5,054,120 | 10/1991 | Ushiyama et al. | |
| 5,055,851 | 10/1991 | Sheffer. | |
| 5,063,560 | 11/1991 | Yerbury et al. | |
| 5,073,976 | 12/1991 | Kennedy. | |
| 5,077,834 | 12/1991 | Andros et al. | |
| 5,099,245 | 3/1992 | Sagey | 342/357 |
| 5,119,102 | 6/1992 | Barnard | 342/357 |
| 5,122,795 | 6/1992 | Cubley et al. | |
| 5,136,719 | 8/1992 | Gaskill et al. | |
| 5,142,281 | 8/1992 | Park. | |
| 5,146,227 | 9/1992 | Papadopoulos. | |
| 5,153,582 | 10/1992 | Davis. | |
| 5,155,688 | 10/1992 | Tanaka et al. | |
| 5,155,689 | 10/1992 | Wortham | 364/460 |
| 5,166,694 | 11/1992 | Russell et al. | |
| 5,206,643 | 4/1993 | Eckelt. | |
| 5,208,756 | 5/1993 | Song | 364/449 |
| 5,218,367 | 6/1993 | Sheffer et al. | 342/457 |
| 5,225,842 | 7/1993 | Brown et al. | 342/357 |
| 5,225,847 | 7/1993 | Roberts et al. | |
| 5,227,804 | 7/1993 | Oda. | |
| 5,254,986 | 10/1993 | DeLuca. | |
| 5,258,985 | 11/1993 | Hammerle. | |
| 5,266,945 | 11/1993 | Peek et al. | |
| 5,278,568 | 1/1994 | Enge et al. | 342/367 |
| 5,280,640 | 1/1994 | Bae. | |
| 5,301,358 | 4/1994 | Gaskill et al. | |
| 5,355,522 | 10/1994 | Demange | 455/62 |
| 5,361,258 | 11/1994 | Arnold et al. | 370/69.1 |
| 5,371,899 | 12/1994 | Kuznicki et al. | 455/34.1 |
| 5,386,435 | 1/1995 | Cooper et al. | 375/200 |
| 5,392,452 | 2/1995 | Davis | 379/57 X |
| 5,410,737 | 4/1995 | Jones | 379/59 X |
| 5,438,329 | 8/1995 | Gastouniotis et al. | 455/67.1 X |
| 5,475,868 | 12/1995 | Duque-Anton et al. | 455/62 |
| 5,481,571 | 1/1996 | Balachandran et al. | 455/134 X |
| 5,485,463 | 1/1996 | Godoroja | 370/95.1 |
| 5,487,178 | 1/1996 | Hanninen | 455/56.1 X |
| 5,508,708 | 4/1996 | Ghosh et al. | 455/56.1 X |
| 5,526,401 | 6/1996 | Roach, Jr. et al. | 379/59 |
| 5,530,701 | 6/1996 | Stillman et al. | 455/62 X |

REMOTE INITIATED MESSAGING APPARATUS AND METHOD IN A TWO WAY WIRELESS DATA COMMUNICATIONS NETWORK

FIELD OF THE INVENTION

This invention relates to a radio communication system, and in particular to a technique for transmitting remote field unit initiated data messages over a HF wireless link to a central communications center.

BACKGROUND OF THE INVENTION

There exists a vital and continuing need for wireless communication networks of various types. One particular type of wireless system is focused on the need for reliable two-way data communications. Such networks need not support particularly high data exchange rates, but should provide data communication over as wide a geographic area as possible, such as the continental United States.

Unfortunately, existing and even certain proposed systems costing many millions of dollars have failings of one type or another. Consider, for example, existing wireless wide area data networks which support communication between a remote or mobile field unit and a base station which is terrestrial or satellite-deployed. Terrestrial systems can be further classified as either one-way or two-way. One-way systems, such as nationwide paging networks like SkyTel, provide no capability for a remote user to send data. In addition, such networks also typically exhibit relatively poor penetration of building structures, due to the high carrier frequencies at which they operate.

Other existing and proposed two-way terrestrial systems include the cellular networks, mobile data networks such as RAM, ARDIS, the national wireless network (NWN), EMBARC, and many others. While such systems do provide for two-way initiation of messages, and while the data rates of these systems are typically quite high, each system requires the users to be within a close range, generally 20 miles or less, of the system infrastructure. This infrastructure is extremely expensive, requiring hundreds of millions of dollars to build a nationwide network. It can sometimes be cost effective to only build such infrastructure in areas of high population density, and indeed, roughly 90% of the United States population can be supported by such systems. However, this terrestrial infrastructure only covers approximately 15–20% of the country geographically. It is simply not economical for providers of such services to install the required infrastructure in remote areas of low population density.

Several satellite networks, both existing and proposed, have been designed to address the issue of poor geographic coverage. These satellite-based systems also require a tremendous investment in infrastructure. The infrastructure is located in orbit where it cannot be installed, maintained or replaced without large expenditures for space-born vehicles. In addition, the mobile subscriber devices required to communicate with such systems are relatively expensive. Furthermore, the field devices need to be within the line of sight of the satellite since they must typically have overt high gain electromagnetic reception devices, such as dishes or long antennas. Such systems are thus impractical for certain applications.

Consider the problem faced by the manager of a fleet of rental cars. The assets which the manager is responsible for are highly mobile—indeed, they can be located virtually anywhere in the continental United States. The assets are easily stolen and expensive to insure. The assets can also become unproductive when a rental customer fails to return a vehicle to its proper location. Rental cars can also become 'lost' when there is poor communication between retail outlets, and valuable up-time of the rental asset is then squandered.

Another issue important to managers of rental fleets is the safety of their customers. Rental car drivers, and in fact, all drivers, could benefit from a low cost, highly reliable, wide area system to summon emergency assistance at any time, from any location, without leaving the vehicle.

Analogous problems exist in other industries. For example, there is increasing pressure on the railroad industry to move towards scheduled service, to facilitate just-in-time delivery in an effort to better compete with the trucking industry. To achieve this goal, the manager of a railroad system should ideally be able to quickly determine the location of each and every rail car on a regular basis, no matter where the rail car is located. Optimum routing and delivery time can then be accurately predicted.

Other industries, such as the trucking and shipping industries, may also benefit from the ability to inexpensively and accurately track the location of shipping containers no matter where they are located. Any one shipping container may hold thousands or potentially millions of dollars of valuable goods, and clearly, those responsible for the well being of the goods in transit would like to know where they are at all times.

In any of these applications, the fleet manager would very much like to be able to rely upon the remote field unit to initiate the transmission of a message to a central controller indicative of the field unit's location and/or status. These transmissions may occur, for example, upon a certain event (e.g., summoning emergency help), or periodically such as once every several hours, once a day, etc. . . . based upon the particular application.

The same type of generic problem (i.e., small amounts of data are required from very remote or highly mobile field unit on an in-frequent basis at low cost) exist in the areas of remote meter or sensor reading, facility monitoring, security, buoy monitoring, and other applications.

While the needs of each of the above identified applications can be met by combining a position sensing device such as a Global Positioning System (GPS) or a Loran receiver in each remote field unit, together with an existing two-way mobile data communication device such as a cellular or satellite transceiver, each of these systems would be too expensive since the service carries with it relatively high connect time charges and monthly service fees. Therefore, cellular and satellite transceiver systems are not feasible solutions due to their prohibitive cost.

DESCRIPTION OF THE INVENTION

Objects of the Invention

An object of the present invention is to provide a data communications system in which a very remote or highly mobile field unit may initiate, on its own, the transmission of relatively small amounts of data to a mission operation center (MOC).

Another object of the present invention is to provide a data communications system which allows long range radio data communications between a plurality of field units and the MOC over non-dedicated frequency channels.

A further object of the present invention is to provide ubiquitous data communications over a wide geographic area such as the continental United States, while requiting a minimum of capital expenditures for new infrastructure, and minimum operating costs.

The system architecture should be such that it uses simple and economical field devices costing far less than, for example, a comparable satellite data terminal.

The field traits should not require direct line of sight with a base station unit for communication to be successful and reliable.

The field units should also be able to operate on battery power, eliminating the need for external power supplies as typically required for satellite-based systems.

Any data transfer mechanism utilized should provide highly reliable service, on the same order as that of radio broadcasters.

Finally, the use of the system should cost the customer far less than existing paging, cellular or satellite systems.

SUMMARY OF THE INVENTION

Briefly, the invention is a field unit initiated data communications system that includes a mission operations center (MOC) which provides an outbound data message containing information on available inbound radio frequencies to one or more field units which may initiate, on their own, the transmission of an inbound data message on one of the available inbound frequencies, to at least one of a plurality of widely distributed a radio base stations which route the inbound message to the MOC.

To determine the available inbound frequencies and the time slots during which those frequencies are available, the MOC is regularly updated with information on possible available inbound frequencies from each of the radio base stations. From these frequencies, the MOC selects the available inbound frequencies the field units may use to initiate inbound messages, and encodes these available inbound frequencies into the outbound data message which is forwarded to all the field units. In one embodiment, the outbound data message is communicated to all the field units using an outbound message system, such as a paging system or other wireless network.

The MOC also provides the available frequencies and their corresponding time slots to the radio base stations, so each station can tune its receivers to receive any field unit initiated inbound messages.

Time synchronization between the radio base stations and field units may be by any convenient method such as known time sounders, or by time reference signals available from the geolocation or paging receiver.

When a field unit wishes to initiate an inbound message, it selects one of the available frequencies contained in the outbound data message and transmits the inbound message to the radio base station at the selected available frequency. To facilitate long range communications, the inbound frequencies are preferably short-wave radio carrier frequencies within the high frequency (HF) radio band facilitate long range communications.

The inbound data message is preferably encoded with a broadband encoding scheme, such as spread spectrum modulation, to minimize the probability of interfering with existing broadcast systems or other communications at nearby frequencies in the HF band.

Upon receiving a field unit initiated inbound data message from one of the field units, the radio base station will route it to the MOC which in turn may forward the message to the appropriate customer or act upon the message depending upon its contents. Upon receipt of a field unit initiated inbound data message, the MOC forms and transmits an outbound acknowledgment message which is routed via the outbound message system to the field unit which transmitted the inbound data message.

The field unit initiated data communications system consists of four primary sub-systems, including: 1) the mission operation center (MOC), 2) the outbound messaging system, 3) the remote field units and 4) the inbound radio base stations.

The MOC provides central control of the radio base stations and periodically (preferably in real-time) receives reports of possible available frequencies from the radio base stations, and the time slots during which the frequencies are estimated to be available. The MOC maintains a database of these frequencies and timeslots. Communications between the MOC and the base stations is generally through modems using appropriate low cost land-based connections such as the PSTN, leased or private telephone circuits, very small aperture terminal (VSAT) wireless networks, or other cost-effective connections, depending upon the number and location of the base stations.

Since the transmission of the field unit initiated inbound message may be on a non-dedicated radio frequency band (i.e., the frequency may be licensed to another user), the MOC processes the information about each of the possible available frequencies to estimate which frequencies have the least probability of interference with another user, such as a licensed user of the frequency. The MOC selects several of these frequencies, and formulates the outbound data message with the available frequencies and their respective time slots as data arguments. The MOC then forwards the outbound data message to an outbound messaging system (e.g., a paging network), requesting that the outbound data message be sent to all the field traits. This request to the outbound messaging system is typically sent via any convenient land-based media, such as the PSTN, VSAT, or other type of data communications network.

The outbound messaging system includes a plurality of geographically diverse radio transmission systems which each receive and transmit the outbound data message. The outbound messaging system may be any convenient low-cost radio transmission system for transmitting data. Although existing paging network infrastructures are ideally suited for the outbound link, it should be understood that other systems can be used as well, such as a private radio network, a cellular mobile telephone (CMT) network, a satellite network, or any other appropriate wireless transmission system.

The radio base stations perform several functions. First, to assist in the MOC's estimation of which frequencies will be available for transmission of inbound messages, each radio base station periodically checks each possible inbound link channel to determine if the channel is in use. This may be done, for example, by measuring a receive power level in each channel, or by sampling sub-bands in each channel and integrating the detected signal power level over time, or by using other known signal detection algorithms. Second, the radio base stations receive the inbound messages from the field units and route the messages to the MOC.

To capture the inbound messages from the field units, the radio base stations each include several tunable HF receivers. Upon receiving a command from the MOC to expect a possible inbound message at the available frequencies and times, each base station allocates and tunes its HF receivers, and waits for a possible reception of the inbound message.

If an inbound message is received, the radio base station routes the message to the MOC via a modem or other data communications paths. Note, the receipt of field unit initiated inbound messages may be aperiodic since the field units will generally only initiate a transmission on an infrequent basis.

Upon successful receipt of a field unit initiated inbound message, the MOC formats and sends, via the outbound messaging system, the outbound acknowledgment message to the field unit which transmitted the inbound message. If the field unit does not receive the acknowledgment message from the MOC within a certain period of time after transmitting the inbound message, the field unit selects another frequency value from the most recent outbound data message and retransmits the inbound message during the appropriate time slot.

The communication system of the present invention provides several advantages.

The system permits very remote or highly mobile field units to initiate a transmission, on their own, of relatively small amounts of data over long range radio links in near real-time and at relatively low cost.

Ubiquitous coverage over a wide geographic area such as the continental United States is possible using existing paging systems for outbound messaging and a small network of short wave radio base stations for receiving the inbound messages. The system thus requires a minimum of capital investment for new infrastructure, and significantly lower monthly operating costs.

In addition, the field units preferably use short wave HF transmitters which do not require a direct line of sight to reliably communicate with the radio base stations. Therefore, the radio base stations can be located up to about 1,000 miles away from a remote field unit.

The field units may operate on battery power such as conventional paging receivers, since, the field unit's transmitter will only be infrequently activated, and even then, only for a short duration burst inbound message.

BRIEF DESCRIPTION OF THE DRAWINGS

The above and further advantages of the invention may be better understood by referring to the following description in conjunction with the accompanying drawings in which.

DETAILED DESCRIPTION OF A PREFERRED EMBODIMENT

Figure 1:
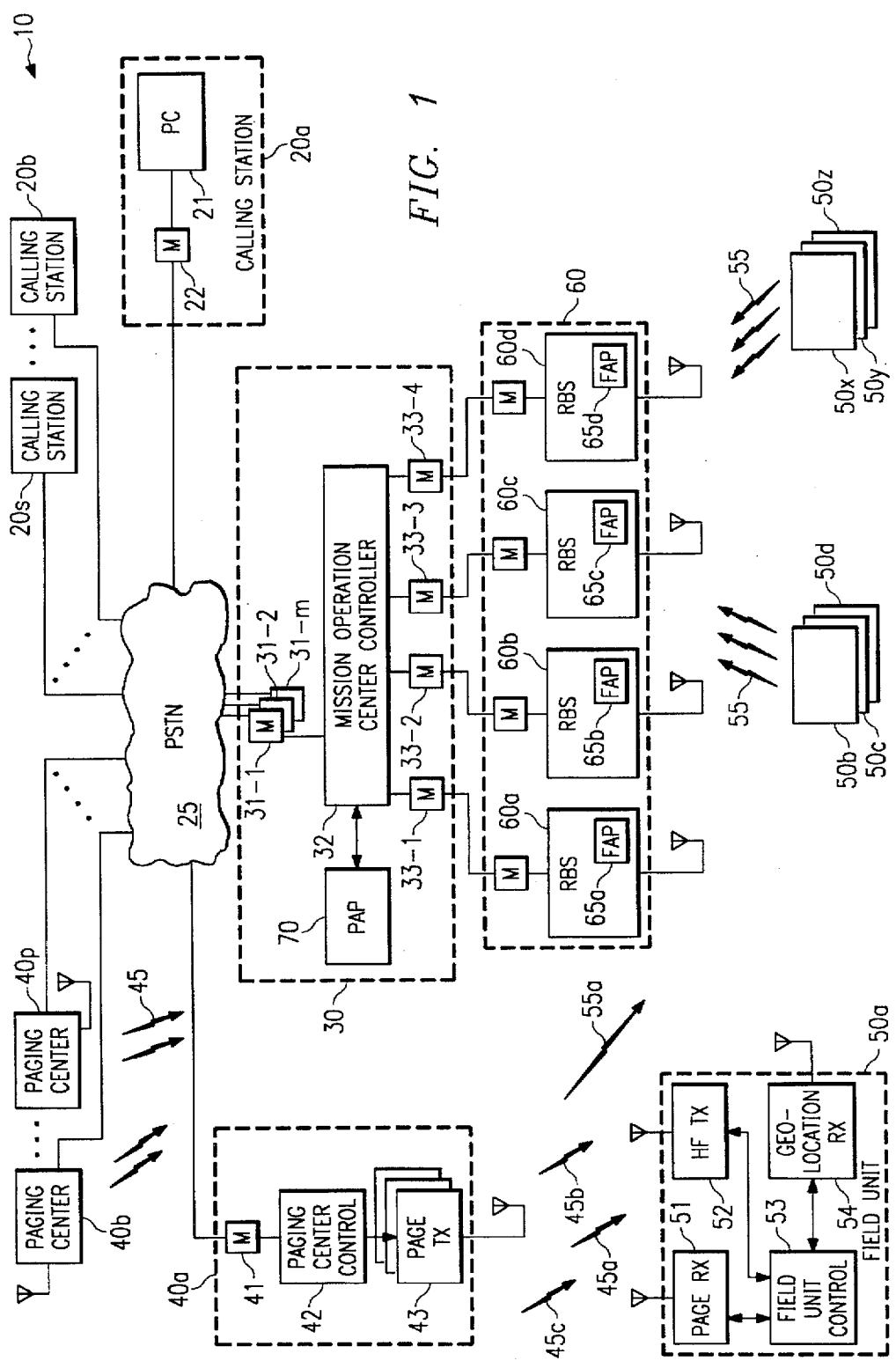
FIG. 1 is a block diagram of a two-way radio communication network.

Turning attention now to the drawings, FIG. 1 illustrates a block diagram of a two-way wireless communications system 10. The system 10 includes a number, S, of calling stations 20a, 20b, ..., 20S (collectively, calling stations 20), a data communication mechanism 25, a mission operation center (MOC) 30, a number, p, of geographically dispersed outbound messaging sub-systems 40a, 40b, ..., 40p which cover a wide geographic area such as the continental United States or Europe, multiple mobile or remote field units 50a, 50b, 50c, 50d, ....., 50x, 50y, 50z, and an inbound messaging sub-system which may make use of a number of (e.g., four) radio base stations (RBSs) 60a, 60b, 60c, and 60d, which are also geographically dispersed to provide ubiquitous coverage.

The data communication mechanism 25 may preferably be a public switched telephone network (PSTN), as shown. However, private networks, very small aperture terminal (VSAT) networks, and other types of communication networks may also be used.

The outbound messaging systems 40 provide radio links 45 which are used for communication from the data communications mechanism 25 to the remote field units 50. These radio links are referred to herein as the outbound links 45. In a preferred embodiment, the outbound links 45 may be provided by multiple paging sub-systems 40. However, other systems such as nationwide paging systems, satellite networks, private radio networks and the like can be used to provide the outbound links 45. Thus, while the outbound messaging system 40 may be referred to in some instances herein as a paging system, it should be understood that other types of outbound radio links may be used as well.

Radio communication from the field units 50 sent to the network of RBSs, are referred to as the inbound links 55. The inbound links 55 are preferably spread spectrum encoded, short wave radio links operating in the high frequency (HF) radio band.

The wireless communications system 10 provides two-way data communication on a near real-time basis across a broad geographic area such as may be conveniently covered by a network of only a few short-wave radio base stations 60. This architecture eliminates the need for costly, custom and ubiquitous or expensive infrastructure as now required by cellular and other terrestrial systems as well as satellite-based systems. For example, existing paging sub-systems may be used to provide the outbound links 45, and the network 25 may be the public switched telephone network. The system is thus far more maintainable and less expensive to support then competing cellular, multicast paging, or satellite systems.

The field units can be designed to operate with minimal standby power as available from a battery or solar power, which is ideal in remote locations in which access to external power is not readily available, reliable or secure.

Because the radio base stations 60 use short-wave HF signaling, a direct line-of-sight is not required between the radio base stations 60 and the remote field units 50. Thus the system 10 can still operate properly even in situations where line-of-sight propagation is not possible, such as in stacked containers or in densely populated urban areas. The system 10 thus exhibits greater availability than competing satellite-based systems.

According to the present invention, any remote field unit 50 may initiate, on its own, the transmission of an inbound message to the MOC 30 via the radio base stations 60. The MOC periodically sends an outbound data message containing data fields of available frequencies over which the field units may transmit field unit initiated inbound messages. The outbound data message also contains fields defining the time slots during which the field units 50 may use the available frequencies.

Each of the components of the communication system 10 and its operation will now be discussed at an increased level of technical detail in order that one of ordinary skill in the art may more readily understand how to build and operate the field unit initiated inbound messaging system of the present invention.

Message Formats (FIGS. 2A through 2D)

Figure 2A:
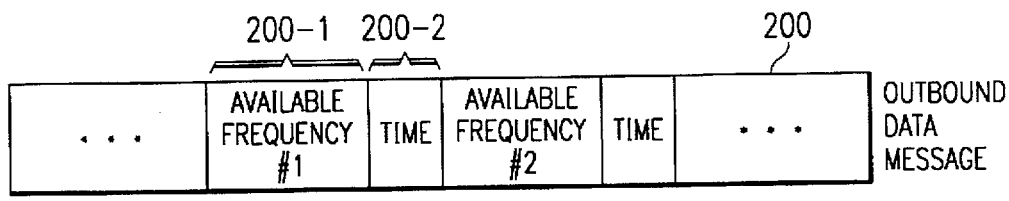
FIG. 2A illustrates the format of an outbound data message sent from the mission operation center (MOC) to a field unit over the paging network.

FIG. 2A illustrates the format of an outbound data message 200 sent from the MOC to all the field units over outbound links 45 (FIG. 1) using the paging network 40 (FIG. 1). At a minimum, the message 200 includes at least one data field 200-1 indicating an available frequency for transmission of a field unit initiated inbound message from any of the field units. The outbound data message 200 also includes a second field 200-2 that indicates the time slot within which the field units may transmit a field unit initiated inbound message. In general, however, the outbound data message will contain a plurality of available frequencies and time slots which any of field units may use to initiate an inbound message.

Figure 2B:
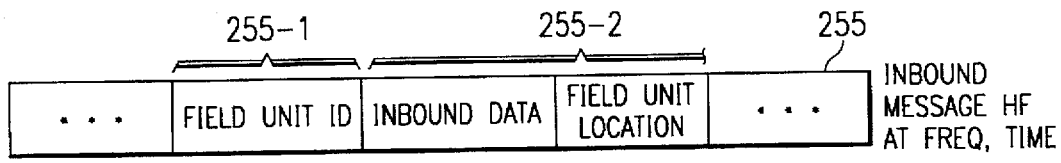
FIG. 2B illustrates the format of a field unit initiated inbound message sent from the field unit to a remote base station (RBS) at a particular time and frequency within a short-wave radio band, and as forwarded from the RBS to the MOC.

FIG. 2B shows the format of the field unit initiated inbound message 255 from the field units 50 over the inbound links 55, including a field unit ID field 255-1 as well as inbound data field 255-2 containing data from the field unit 50a. Such inbound data 255-2 may, for example, in the case of a mobile field unit 50, include information concerning the position of the field unit in terms of latitude and longitude, along with an emergency code. However, it should be understood that the field unit 50 may also be stationary, and hence, inbound data 255-2 other than position information may be sent depending upon the customer's application.

Figure 2C:
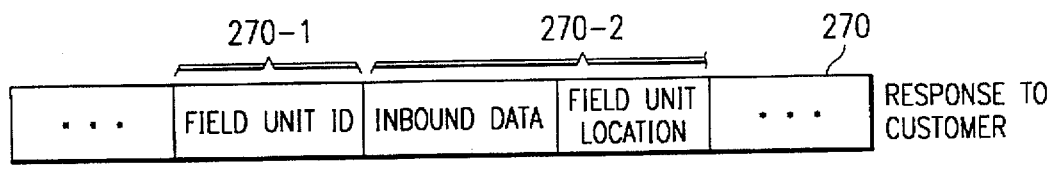
FIG. 2C illustrates the format of the inbound message as sent from the MOC to a customer.

FIG. 2C illustrates the format of a message 270 sent by the MOC to the calling station 20 in response to receipt of the field unit initiated inbound message 255. The message 270 includes the field unit ID 270-1 if necessary, as well as the inbound data 270-2 returned.

Figure 2D:
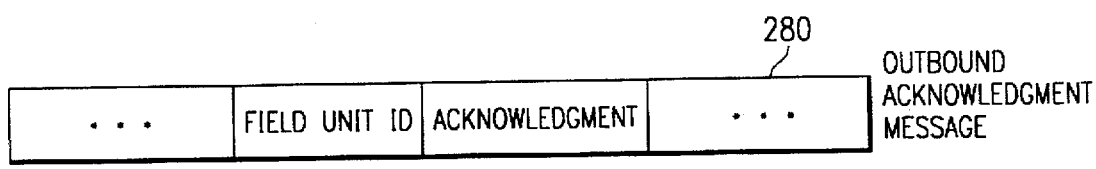
FIG. 2D illustrates the format of an outbound acknowledgment message sent from the MOC to the field unit which transmitted the field unit initiated inbound message illustrated in FIG. 2B.

FIG. 2D illustrates the format of an outbound acknowledgment message 280 sent from the MOC to the field unit which transmitted the field unit initiated inbound message 255. This acknowledgment message is sent to the outbound messaging system 40 (FIG. 1) and passed onto the appropriate field unit.

It should be understood that the illustration of the message formats in FIGS. 2A through 2D is not restrictive, and that the various fields may occur in any order in each respective message. Each message 200, 255, 270 and 280 will also typically have additional fields such as header fields, checksums, routing or synchronization information and any other fields as normally required in any message communication system depending upon the needs of a particular application/customer.

Calling Stations 20

Referring to FIG. 1, calling stations 20a, 20b, . . . , 20s provide an interface for customers to interact with the system 10. A typical one of the stations 20a is embodied as a personal computer (PC) 21 having an appropriate standard, well-known communications device such as a computer modem 22 which allows the MOC to forward the calling stations, inbound messages over the PSTN 25. The MOC thus also has a bank of computer modems 31-1, 31-2, . . . , 31-m to communication with multiple calling stations 20.

Mission Operation Center (MOC) 30

The MOC 30 includes a computer, referred to as the mission operation center (MOC) controller 32, and multiple modems 31-1, 31-2, . . . , 31-m and 33-1, 33-2, . . . , 33-4. The MOC uses the modems 31 for communications over the network 25 with at least the calling stations 20 and the outbound messaging network 40.

The MOC may also use other modems 33-1, 33-2, 33-3 and 33-4 to communicate with the radio base stations (RBSs) 60. Since the MOC needs to communicate frequently with the RBSs, and because there will generally only be a handful of RBSs (e.g., four), the MOC may connect the modems 33 to dedicated telephone circuits such as leased lines, packet switch networks, or other cost-effective, high data-rate longline services.

Figure 3:
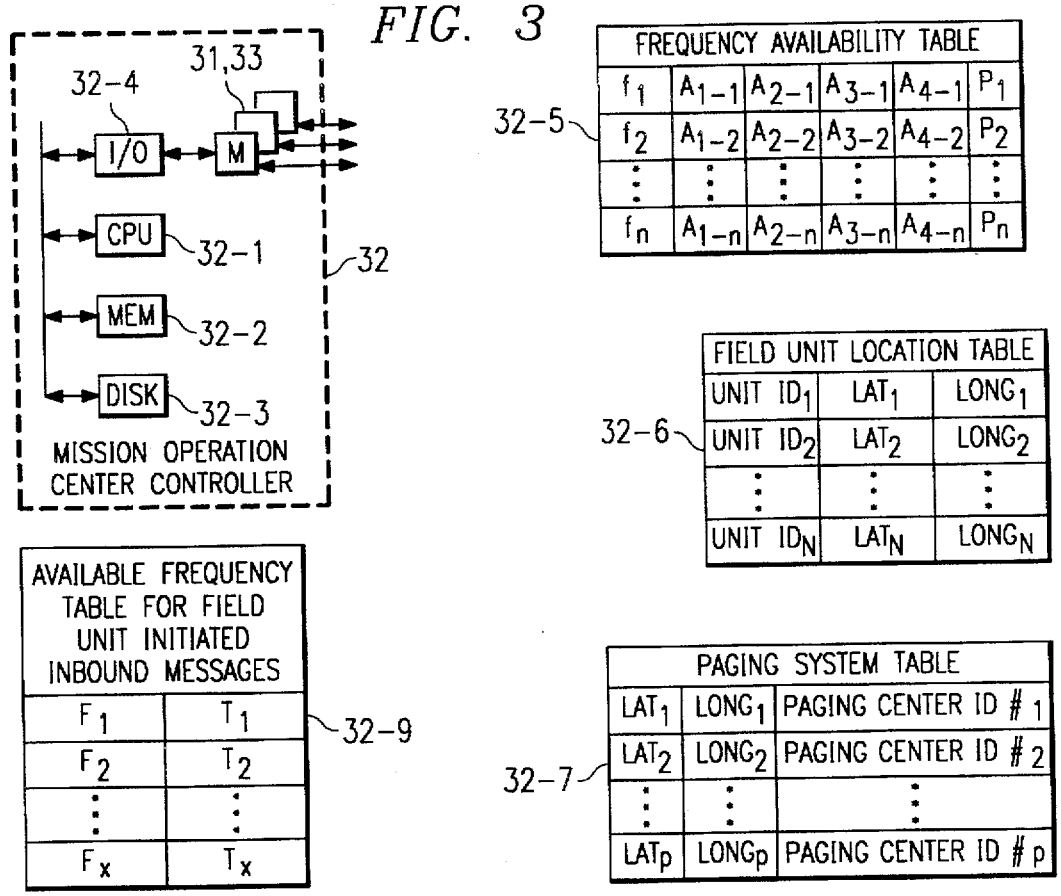
FIG. 3 is a block diagram of a MOC control unit showing several databases, or tables, maintained by the MOC.

FIG. 3 shows a more detailed block diagram of the MOC controller 32 and various databases 32-5, 32-6, 32-7, 32-9 it maintains in support of field unit initiated inbound messaging. The MOC controller 32 includes the usual components of a computer system such as a central processing unit (CPU) 32-1, memory 32-2, disk storage 32-3, and an input/output (I/O) interface 32-4. Because the MOC controller 32 is primarily responsible for coordinating communication between a number of different devices, the architecture of the computer system is preferably an appropriate interrupt-driven or multitasking system.

In order to determine the frequencies the field units 50 may use to transmit field unit initiated inbound messages, the MOC controller 32 maintains a first database referred to as a frequency availability table 32-5. This table includes utilization information on each HF frequency channel $f_n$ which may be used for inbound messages. Each of the RBSs 60 (FIG. 1) reports to the MOC 30, via a data link, the amount of energy measurable at the RBS location for each frequency $f_n$. As an example, RBS 60-1 (FIG. 1) periodically reports a list of $f_1, f_2, \ldots, f_n$ possible available frequencies, or open channels, that the RBS 60-1 is presently seeing, and the noise amplitude level $A_{1-1}, A_{1-2}, \ldots, A_{1-n}$, associated with each such frequency. Likewise, the other RBSs 60-2, 60-3, and 60-4 also periodically report amplitude levels $A_{2-1}, A_{2-2}, \ldots, A_{3-n}, \ldots$, and $A_{4-n}$ measured at their respective locations for frequency channels $f_1, f_2, \ldots, f_n$. The precise manner in which each RBS 60 determines an available frequency is discussed below.

Table 32-5 also contains a propagation probability, $P_n$ for each of the frequency values $f_n$ in the table. The propagation probability values $P_n$ can be computed by knowing the time of day and atmospheric conditions which allows known ionospheric modeling algorithms to compute a propagation probability for each frequency $f_n$. However, it is contemplated that even more sophisticated propagation prediction algorithms may also be used depending upon the geographic configuration of the RBSs 60. For additional details on the frequency selection and a propagation probability computation, see the commonly assignable, co-pending application entitled "Technique for Determining Propagating and Clear Frequency to be Used in Wide Area Wireless Data Communications Network", designated Cesari & McKenna docket number 111045-2, filed even date herewith, and which is hereby incorporated by reference.

The MOC controller 32 may also maintain a field unit location table 32-6 to keep track of the last known location of each deployed field unit 50. Each entry in this table consists of a field unit ID code, along with position information (e.g., latitude and longitude) as last reported by the field unit. The MOC controller 32 maintains and updates this table 32-6 as field units 50 are added or removed from service, and as inbound messages 255 (FIG. 2C) are returned by each field unit indicating its latitude and longitude.

As mentioned above, in the preferred embodiment the outbound links 45 are provided by several paging subsystems 40. A third table 32-7 is thus used to maintain information on the various paging systems 40a, 40b ... 40p which together form the outbound messaging system 40. This table 32-7 is updated whenever arrangements for the use of various paging systems are made by the operator of the system 10. The table 32-7 may also include details of how the MOC controller 32 can access each different paging system, such as modem telephone numbers, protocol types, and the like. The MOC controller 32 also maintains an available frequency table 32-8 containing data on the available frequencies and time slots transmitted in the last outbound data message.

Figure 4:
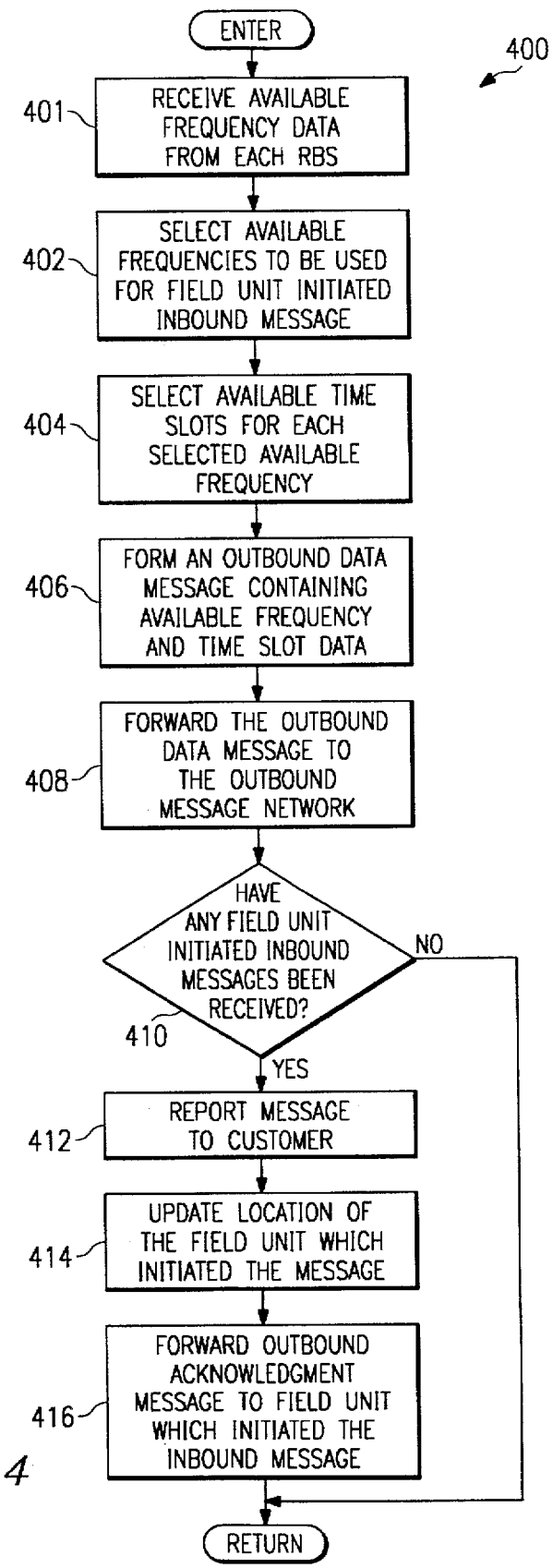
FIG. 4 is a flowchart of the operations performed by the MOC including the steps performed to generate the outbound data message.

FIG. 4 is a flowchart of a processing routine 400 performed by the MOC controller 32. The controller performs a first step 401 to receive the possible available frequency data from the RBSs 60 and update Table 32-5 (FIG. 3), including propagation probabilities $P_n$. The frequencies to be used for field unit initiated inbound messaging are then selected in step 402 based upon the propagation probability values $P_n$ and frequency utilization as measured at the various radio base station sites. In general, the frequency values selected in step 402 represent the most available frequencies. That is, each frequency has a high probability of propagation $P_n$ and a relatively low noise level $A_n$. The time slots for transmission on the available frequencies are then determined in step 404 by adaptively estimating when each of the available frequencies will be available.

In selecting the frequency, f, to be utilized, the MOC controller 32 attempts to minimize the noise and interference power on the frequencies in use by all of the RBSs. Thus, for example, since other users appear as noise or interference, and since the exact location of the field unit is not known, the MOC preferably chooses a frequency which is reporting the lowest average noise power $A_n$ across all the RBSs 60 and is estimated to remain low for the time it takes to complete an inbound message. This minimizes the chance of interfering with another user of the HF spectrum.

Other techniques may also be used to refine the frequency selection process. For example, the MOC controller 32 may selectively exclude from the frequency selection process designated portions of the HF radio spectrum known to contain fixed transmitters or known interferes. In addition, the propagation probability factor, $P_n$, may be used to further refine the selection of a frequency, f. For example, if a frequency is clear, that is, each of the four RBSs reported low noise amplitudes $A_1, A_2, A_3, A_4$ for that frequency, but the probability of successful propagation $P_n$ is low, then another frequency is selected from the table 32-5.

In addition, minimizing the time between observing a clear frequency and then selecting it for transmission in step 402 is also key to successful communication, and is the reason why the RBSs are requested to update the frequency availability table 32-5 in near real time. The system 10 is thus designed so that the MOC controller 32 utilizes the chosen frequency within several seconds, and then deallocates it.

In determining the design feasibility of the system 10, a computer model of the probability of the occurrence of a conflicting use in the European environment was performed. The European environment is typically much more demanding than the average environment in the United States. Table 1 below shows the probability that an available frequency will be utilized by another conflicting user, after the MOC controller 32 has identified it as clear but before the transmission of the inbound message has completed.

TABLE 1

| Elapsed Time From Frequency Choice | Interference Probability |
|---|---|
| 3 seconds | 0.01 |
| 10 seconds | 0.03 |
| 30 seconds | 0.10 |
| 1 minute | 0.15 |
| 6 minutes | 0.63 |

The information in Table 1 can thus be used to determine how often the frequency availability table 32-5 should be updated, depending upon an acceptable probability of interference with the inbound link.

In step 406 the outbound data message 200 (FIG. 2A) is formed containing data fields for the available frequencies, and time slots. The outbound data message 200 is then forwarded in step 408 to the outbound message network 40 which transmits the outbound data message to all the remote field units 50. A list of the available frequencies and the time slot for each is maintained by the MOC controller 32 in table 32-9 (FIG. 3).

The next task for the MOC controller 32 is step 410 to determine if any remote field units 50 have forwarded a field unit initiated inbound message (or messages) to the MOC 30 via the RBSs 60. If so, the message is retrieved and acted upon or forwarded as necessary in step 412 to a customer calling station 20. Since the inbound message will also preferably contain a field specifying the remote field units latest position, step 414 updates the field unit locator table 32-6. The MOC will then form and forward an outbound acknowledgment message in step 416 over the outbound message network 40 to the field unit which initiated the inbound message.

Outbound Radio Links 45 and Inbound Radio Links 55

Referring again to FIG. 1, all outbound links 45 preferably utilize existing FCC licensed communication media, such as the existing paging network infrastructure. However, such outbound links 45 may also be provided by established public or private carriers such as frequency modulated (FM) subcarrier network paging systems which use special radio networks, high frequency (HF) radio networks, or other types of suitable outbound radio links 45, depending upon the nature of the field units 50. For example, if the field units 50 are expected to be located in stacked containers, outbound links 45 must be implemented using a radio communication methodology that does not requires line-of-sight.

The inbound links 55 make use of high-frequency (HF) radio stations 60 which operate with carrier frequencies in the radio spectrum from about 3 to 30 MHz. There are two critical elements in establishing reliable communication in the HF inbound links from the field units 50 to the RBS network 60.

First, the remote field units 50 must be instructed as to which available frequencies in the HF band are propagating between itself and the network of RBSs 60. Due to the multiple atmospheric phenomena in HF communication, which occurs over long distances principally by ionospheric reflection, different portions of the spectrum from 3 to 30 MHz propagate in different directions at different times of the day, and depending upon sunspot activity.

Secondly, of those frequencies which are propagating, it must be known which channels are available, that is, which channels are presently not being used.

Paging Network 40

Referring to FIG. 1, an exemplary outbound messaging sub-system may be a paging system 40a which is a standard paging system that can accept a request for a page from the network 25. As is known in the art, such paging systems 40a include a modem 41 for accepting page requests, a paging center controller 42 which is typically a computer of some type, and a number of paging system transmitters 43-, 43-1, ..., 43-n. When the outbound data message 200 (FIG. 2A) is sent from the MOC 30, the paging sub-system 40a formats and broadcasts the outbound data message 200 in the conventional manner. The paging system 40a need not be a two-way system or otherwise require any acknowledgment of receipt of the page from the field units 50.

Field Units 50

As illustrated in FIG. 1, an exemplary field unit includes an outbound message receiver such as a paging receiver 51, a tunable HF transmitter 52, a field unit controller 53, and a data collection apparatus such as a geolocation receiver 54. The geolocation system receiver 54 may be one of any known types such as a global positioning system (GPS) or Loran receiver.

Figure 5:
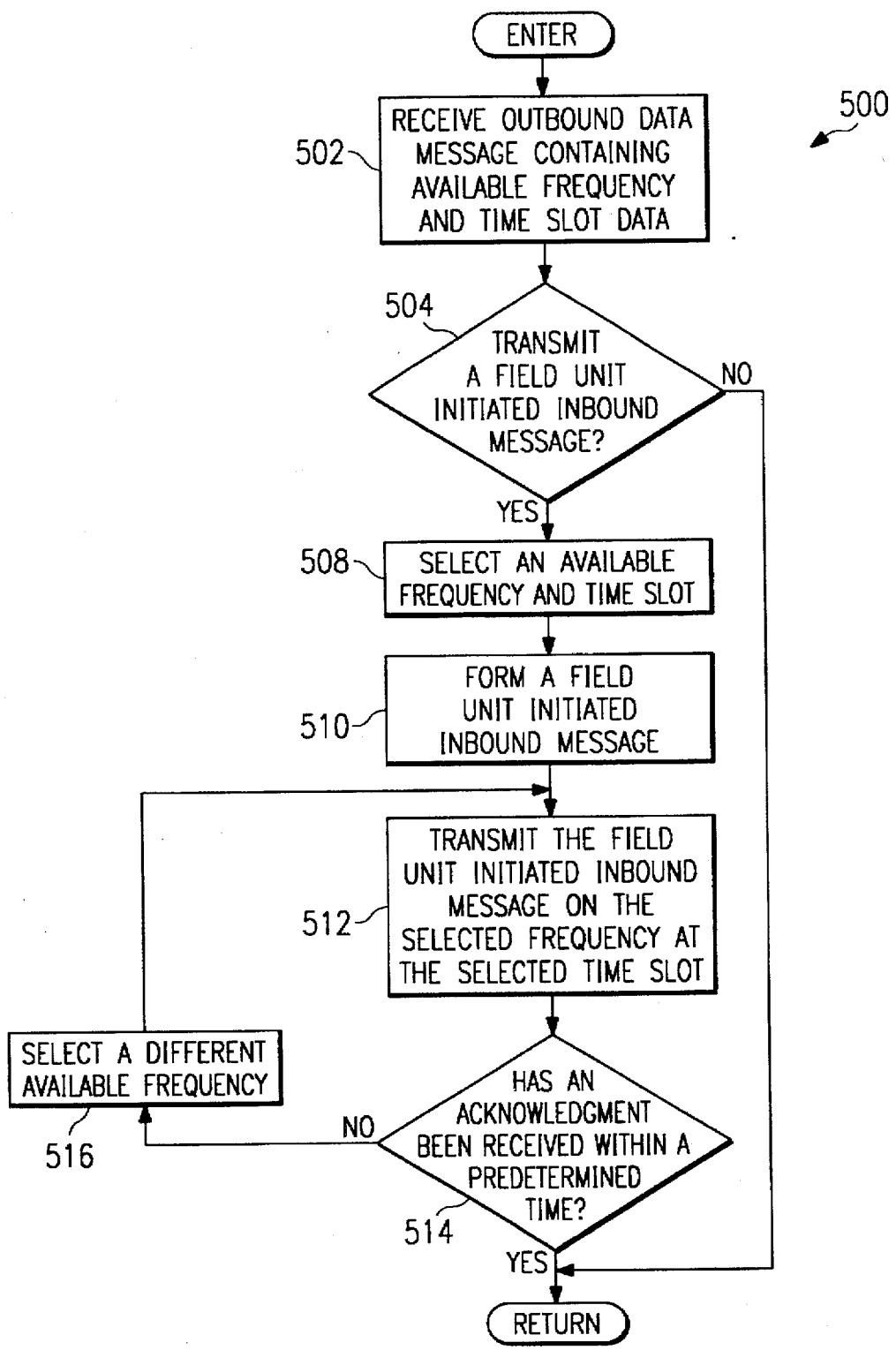
FIG. 5 is a flowchart of the operations performed by each of the field units.

FIG. 5 is a flow chart illustration of a routine 500 performed by each field unit. Upon entry into the routine 500, step 502 receives the outbound data message 200 (FIG. 2A) containing the available frequency channels, f, and time slots, t, which the field units may use to transmit a field unit initiated inbound message. Step 504 then determines if the field unit wishes to initiate, on its own, the transmission of an inbound message.

If the field unit wishes to initiate an inbound message, step 508 selects, from the most recent outbound data message 200, an available frequency and time slot to transmit on. Step 510 is then performed to form the field unit initiated inbound message 255 (FIG. 2B) containing the data the field unit wishes to transmit. As an example, if the field unit is located in a shipping container, an alarm may trigger the unit to initiate a data transfer indicating that someone has opened the container without authorization, and the location of the container. In addition, an inbound message may also be initiated by a rental car driver depressing an emergency button to transmit the location of the vehicle to the MOC. One of ordinary skill will appreciate that there are many applications which may find the low cost field unit initiated messaging of present invention useful.

Once the inbound message has been formed, step 512 is performed to transmit the inbound message on the selected frequency and at the appropriate time. In general, this involves tuning the field unit transmitter 52 (FIG. 1) and waiting until the appropriate time as specified in the outbound data message, before performing the actual transmission over the inbound radio link 55 (FIG. 1). The transmission time-slots on the inbound communication links 55 may be synchronized using universal time standard data, as may be available from a GPS receiver 54 or other broadcast time standard transmitters.

Unique, non-interfering characteristics of the inbound HF links 55 are thus possible because the remote field units 50 already know, before transmitting, which frequencies are not in use at particular times. The frequency is then quickly vacated after its single use by the MOC controller 32, leaving it available for other uses, such as its regularly licensed use.

In addition, the field units only transmit on the available frequencies for a short period of time. In particular, the field units 50 preferably use a low-power, spread spectrum HF waveform having a duration of about one (1) to ten (10) seconds to transmit a field unit initiated inbound message. The waveform may, for example, be an eight-level phase shift keyed (PSK) direct spread waveform with a bandwidth of 3 KHz, and a chip rate of about 2400. This provides a data rate of approximately 75 bits per second for inbound messages 255.

The HF transmitter 52 in the remote field unit 50a can thus be instructed by the unit controller 53 to hop to any 3 KHz channel in the 3-30 MHz HF spectrum.

Interference to voice users in the HF spectrum is thus minimal since a data transmission burst from a field unit, even if there is some interference, would be similar to a typical HF channel fade. Other data users of the HF spectrum are also typically equipped to handle second-long channel fades and have typically implemented ARQ schemes or coding interleaving to avoid fading difficulties. Thus, other data users in the HF band should also not notice the existence of the system 10.

Once the field unit initiated inbound message 255 (FIG. 2B) has been transmitted, a test 514 is performed to determine if an outbound acknowledgment message has been received from the MOC, via of the outbound messaging system, within a predetermined time period. The acknowledgment indicates that the MOC has successfully received the field unit initiated inbound message. If the acknowledgment is not received in time, the field unit assumes the transmission of the inbound message was interfered with by another user, and therefore unsuccessful. The field unit will then retransmit the inbound message, but this time at a different available frequency and time slot. Step 516 selects a different available frequency and time slot from the outbound data message. Step 512 is then performed to retransmit the inbound message, but this time, at the new available frequency and time slot. This process is repeated until the transmission of the inbound message is finally successful, or until built-in-test logic (not shown) determines that a major fault exists and the transmit acknowledgment message can not be expected.

Once an acknowledgment message has been received, or it was determined the field unit did not wish to initiate an inbound message (test 504), execution returns.

Radio Base Stations (RBSs) 60

Figure 6:
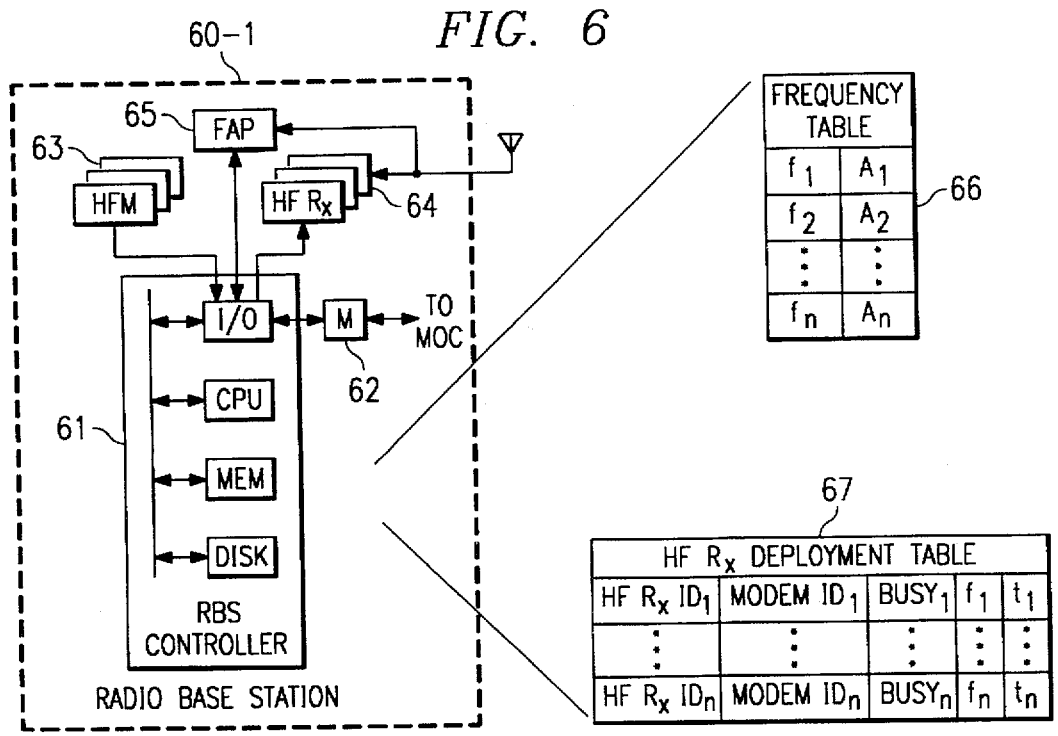
FIG. 6 is a block diagram of an RBS control unit showing several databases maintained by the RBS.

FIG. 6 is a block diagram of a typical radio base station (RBS) 60-1, consisting of a RBS controller 61, a landline modem 62, a pool of HF modems 63 and HF receivers 64, and a frequency analysis processor 65. The RBS controller 61 may be a conventional computer similar to the MOC controller 32. The RBS controller 61 uses the land line modem 62 to exchange messages with the MOC controller 32.

The RBS controller 61 maintains a real time database 66 of possible available frequency channels. Each entry in the table 66 includes an HF frequency, f, and an observed noise level power amplitude measurement, A. The frequency table 66 may be maintained by a frequency analysis processor (FAP) 65 which periodically determines the identity of available (i.e., clear) HF operating frequencies on a regular basis. The FAP 65 may accomplish this by using a sweeping receiver, or may step one or more of the tunable HF receivers 64 throughout the HF frequency band (e.g., 3-30 MHz). The FAP 65 also typically includes a computer or microcomputer. The frequency table 66 may also contain reports of measurements of received signal strength from its own remote devices or known sounders to flasher assist the MOC controller in the prediction of available frequencies.

In most instances, the FAP has a good probability of finding frequencies which are not occupied by another user. Assuming a worst case time of day, such as sunrise, about 2 MHz of HF radio spectrum propagates in any given location. Assuming a channel occupancy of about 30%, which is based upon empirical observations, the system 10 will typically always have at least 466 channels of the required 3 KHz bandwidth available in the 3-30 MHz.

Deployment of the HF modems 63 and associated HF receivers 64 is managed by the RBS controller 61 to receive the field unit initiated inbound messages at the available frequencies and times as specified in the outbound data message. To assist in this process, an HF receiver deployment table 67 is maintained. Each entry in this table 67 contains an HF receiver ID, an associated HF modem ID servicing the channel, and a busy field, B, indicating whether the HF receiver/modem pair are presently assigned. If the busy field indicates active status, the entry also contains a frequency, f, and time, t, at which a field unit initiated inbound message may be received at the HF receiver, modem pair. The HF receivers 64 are adapted to receive the spread spectrum waveform generated by the field units 50, as has already been described.

Figure 7:
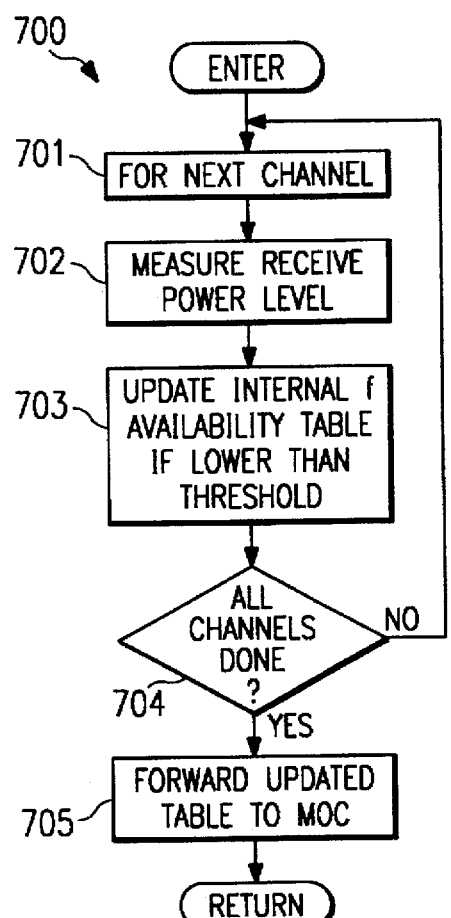
FIG. 7 is a flow chart illustration of the operations performed by the frequency analysis processor (FAP) of the RBS of FIG. 6.

FIG. 7 is a flowchart of the operations 700 performed by a control processor in the FAP 65. Upon entering the routine 700, in step 701 the FAP determines the identity of a next possible available HF channel. In step 702, the FAP then measures the receive power level, and in step 703, if the power level is sufficiently lower than a threshold amount, the FAP updates its internal table 66 (FIG. 6). In step 704, the process iterates until all of the channels are scanned. Finally, in step 705, the FAP forwards the updated table information to the MOC controller 32 over the PSTN 25.

Figure 8:
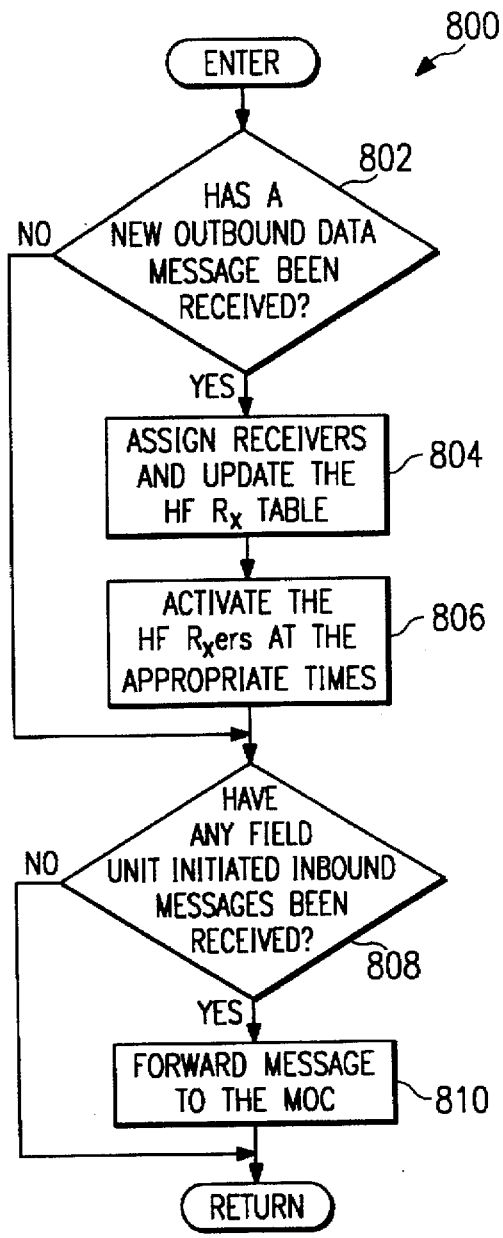
FIG. 8 is a flow chart illustration of the operations performed by each RBS to receive a field unit initiated inbound message.

FIG. 8 is a flow chart illustration of the operations 800 performed by each RBS to receive a field unit initiated inbound message 255. The first step is a test 802 to determine if a new outbound data message 200 (FIG. 2A) has been received. If it has, HF receivers are assigned and tuned in step 804 to the available frequency values f, specified in the outbound data message. The HF receiver deployment table is also updated to indicate that the newly assigned HF receivers and modems are now busy. In step 806 the receivers are then activated at the appropriate time, t, to listen for any field unit initiated inbound messages. The next step is a test 808 to check if any field unit initiated inbound messages have been received. If none were received the routine returns. Otherwise, step 810 is performed to forward the received field unit initiated inbound message to the MOC. Once the MOC receives the field unit initiate message it can either act on the message itself, or pass the information along to a customer calling station 20.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

What is claimed is:

1. A method of operating a communications system to provide ubiquitous wireless data communication services between a plurality of remote field units each capable of initiating, on their own, a field unit initiated inbound message to a message operations center (MOC), by using a network of widely distributed radio base stations (RBSs) and multiple paging systems, the method comprising the steps of:
   A. at the MOC site,
      i. polling the RBSs to determine radio frequencies which are presently suitable for any of the plurality of field units to send a field unit initiated inbound message to one or more of the RBS sites;
      ii. determining available frequencies and times which any of the plurality of field units may send a field unit initiated inbound message;
      iii. formatting the available frequencies and times into an outbound data message;
      iv. forwarding the outbound data message to each of the paging systems;
   B. at each of the paging system sites, transmitting the outbound data message to the field units;
   C. at each of the field units,
      i. receiving the outbound data message;
      ii. determining if a field unit initiated inbound message is required to be sent, and if so,
         a) selecting one of the available frequencies and times from the received outbound data message;
         b) encoding the data to be sent to the MOC in the form of a short duration burst message, to minimize the probability of interfering with existing broadcast or other communications at frequencies near the selected available frequency;
         c) at the selected available frequency and time, transmitting the field unit initiated inbound message;
   D. at the RBS sites,
      i. receiving field unit initiated inbound messages from the field units; and
      ii. forwarding the field unit initiated inbound messages to the MOC.

2. A method as in claim 1 wherein the MOC is connected to the paging systems through a land based public switched telephone network (PSTN).

3. A method as in claim 1 wherein the MOC communicates with the RBSs over a land-based public switched telephone network (PSTN).

4. A method as in claim 1 wherein the MOC communicates with the RBSs over a land-based leased private telephone circuit.

5. A method as in claim 1 wherein the MOC further performs the step of alerting each of the RBSs that a field unit initiated message may be received from any of the field units at any of the available frequencies and times.

6. A method as in claim 5 wherein each RBS further performs the step of periodically measuring a receive power level in each possible inbound frequency channel.

7. A method as in claim 6 further comprising the step of, at each field unit, collecting data which is reported in the field unit initiated inbound message.

8. A method as in claim 2 wherein the short duration inbound message is encoded using spread spectrum modulation.

9. The method of claim 1 further comprising the steps performed at each RBS of:
   receiving the outbound data message from the MOC; and
   tuning a plurality of tunable receivers to the available frequencies specified in the outbound message at the selected time slots.

10. The method of claim 7 wherein each of the available frequencies is a short wave carrier frequency with the HF band.

11. A method as in claim 1 wherein the step of determining available frequencies further includes the step of estimating a probability that radio energy at the frequencies will propagate.

12. A two-way wireless data communication system comprising:
    an outbound messaging subsystem for sending outbound data messages;
    an inbound messaging subsystem consisting of a network of at least two radio frequency base stations for receiving inbound messages, the radio frequency base stations also continuously sampling, at their respective locations, a set of frequency channels in an inbound radio frequency band, to determine an observed frequency availability level for the set of frequency channels for each base station;
    at least one field unit having an outbound message receiver and a tunable inbound message transmitter; and a central control unit, wherein the central control unit uses the outbound messaging subsystem as an outbound link to send an outbound data message to the field unit, and uses the inbound messaging subsystem as an inbound link to receive an inbound message from the field unit, and wherein the outbound message includes data fields indicating available frequencies and times at which the field unit may initiate, on its own, the transmission of an inbound message, and wherein the central control unit receives reports of the observed frequency availability levels from the network of radio base stations, and the central control unit selects the available frequencies, such that, inbound messages will be received at the base stations without interference from another communication system.

13. A system as in claim 12 wherein the inbound messaging sub-system uses the high frequency (HF) radio frequency band as the inbound radio frequency band.

14. A system as in claim 13 wherein the outbound messaging sub-system is a paging sub-system.

15. A system as in claim 14 wherein the central control unit further comprises means for selecting the available frequencies by estimating a probability that radio energy at the inbound frequency will propagate.

16. A system as in claim 14 comprising multiple inbound links implemented by multiple radio base station receivers, and wherein the control unit determines the available frequencies depending upon the observed availability of frequencies at each of the radio base station receivers.

17. A system as in claim 14 wherein each of the field units comprises a geolocational position sensor which determines the location of the field unit and provides a signal value indicative of the position which is encoded into the inbound message to provide the field unit's location to the MOC.

18. A two-way wireless data communication system for communications between a plurality of field units which initiate, on their own, data transmissions to a mission operation center, comprising:

a paging subsystem for sending outbound messages to the plurality of remote field units;

an inbound messaging subsystem consisting of at least one radio base station for receiving inbound messages from the remote field units, the radio base station also continuously sampling, at its respective location, a set of frequency channels in an inbound radio frequency band, to determine an observed frequency availability level for the set of frequencies for the base station;

a central control unit, which sends an outbound data message to the paging sub-system for transmission to all the field units, and uses the inbound messaging subsystem as an inbound link to receive inbound messages from any of the field units, wherein the outbound data message includes data fields indicating available frequencies and times at which any of the field units may send an inbound message, and wherein the central control unit receives reports of the observed frequency availability levels from each of the radio base stations and selects the inbound available frequencies, such that, each inbound message will be received by one or more of the base stations without interference from other communication systems.

19. A system as in claim 18 wherein the inbound messaging sub-system uses the high frequency (HF) radio frequency band as the inbound radio frequency band.

20. A system as in claim 18 comprising multiple inbound links implemented by multiple radio base station receivers, and wherein the control unit assigns the carrier frequency depending upon the observed availability of that carrier frequency in a plurality of the radio base station receivers.

21. A system as in claim 18 wherein the control unit deallocates the selected available frequency after transmission of the inbound message, to minimize interference with other communication systems which make use of that available frequency.

22. In a communication system which provides wireless data communication services between a network of widely distributed radio base stations (RBSs) and a plurality of remote field units, the radio base stations sending messages to the field units by using one or more paging systems, and the field units sending messages to the radio base stations using encoded radio signals in a radio frequency communications band, a method for the remote field units to initiate, on their own, the sending of a message to a message operations center (MOC), the method comprising the steps of:

A. at the MOC site,
  i. polling the RBSs to determine radio frequencies for any of the field units to send a field unit initiated inbound message to one or more of the RBS sites;
  ii. determining times at which any of the plurality of field units may send field unit initiated inbound message;
  iii. formatting the determined frequencies and times into a frequency-and-time-data message;
  iv. forwarding the frequency-and-time-data message to each of the paging systems;

B. at each of the paging system sites, broadcasting the frequency-and-time-data message to the field units;

C. at each of the field units,
  i. receiving the frequency-and-time-data message;
  ii. in response to the field unit having data which is to be sent to the MOC, initiating the transmission of an inbound message to the MOC by the steps of:
    a) selecting one of the available frequencies and times from the frequency-and-time-data message;
    b) encoding the data to be sent to the MOC in the form of a field-unit-initiated message;
    c) at the selected available frequency and time, transmitting the field-unit-initiated message;

D. at the RBS sites,
  i. receiving field-unit-initiated messages from the field units; and
  ii. forwarding the field-unit-initiated messages to the MOC.

* * * * *